Sept. 24, 1957        H. R. THARP        2,807,502
APPARATUS FOR KILLING ROOTS IN UNDERGROUND PIPES
Filed Feb. 6, 1956
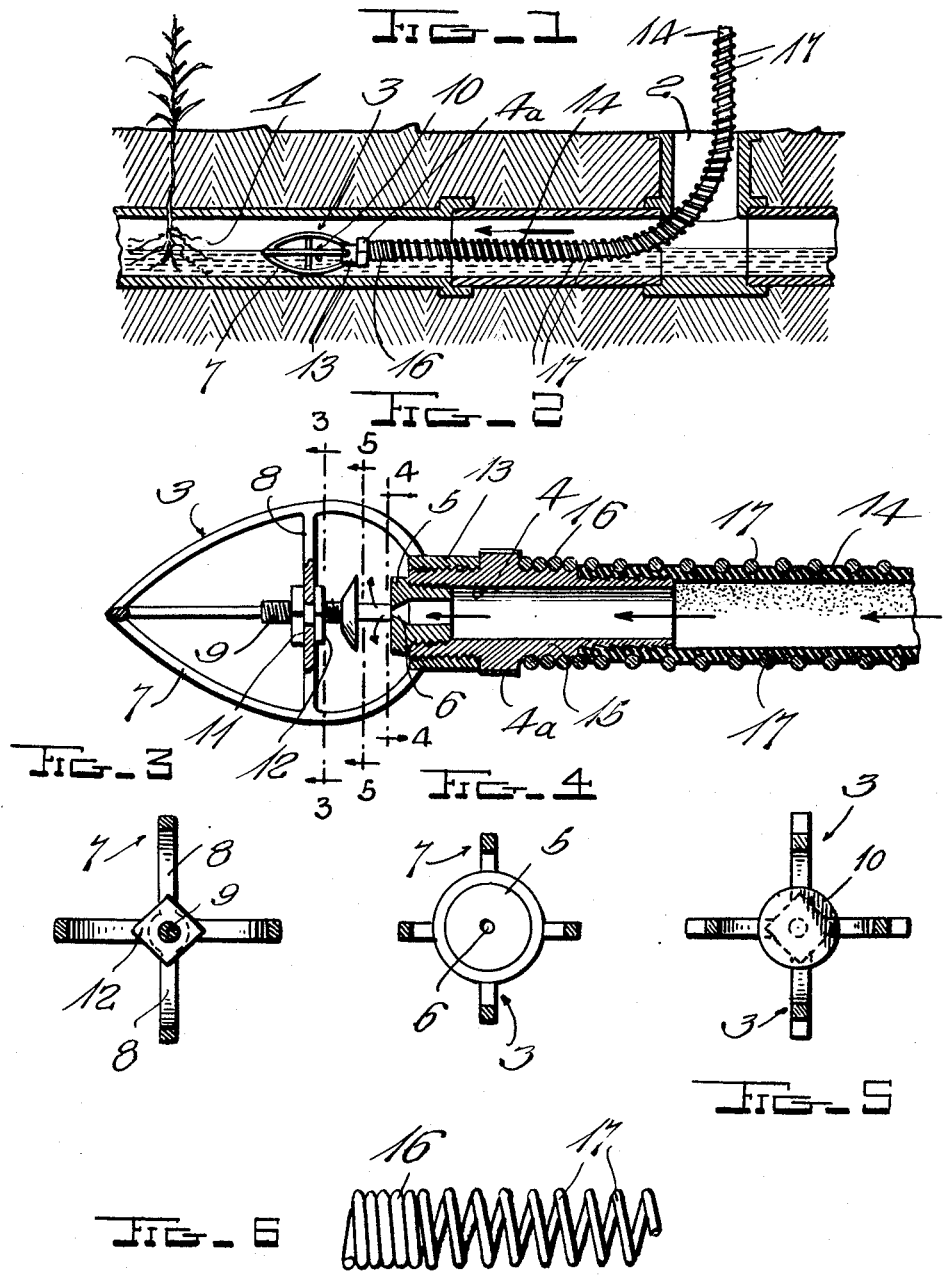
INVENTOR,
Homer R. Tharp,
BY *E. E. Vrooman & Co.*
ATTORNEYS.

United States Patent Office 2,807,502
Patented Sept. 24, 1957

2,807,502

APPARATUS FOR KILLING ROOTS IN UNDERGROUND PIPES

Homer Ray Tharp, San Antonio, Tex.

Application February 6, 1956, Serial No. 563,709

1 Claim. (Cl. 299—76)

This invention relates to an apparatus for killing roots in underground pipes.

An object of the invention is to provide a novel and efficient nozzle device on the outer end of a flexible hose.

Another object of the invention is to provide an efficient nozzle device that is particularly adapted for use in underground pipes for the removal of roots that have entered the underground pipe or pipes.

A further object of the invention is to provide novel means in the nature of a peculiarly coiled wire for use in eliminating clamps in connecting a hose to a nozzle device.

This application is a continuation-in-part growing out of my co-pending application Serial Number 526,434, filed August 4, 1955, now Patent Number 2,763,288.

With the foregoing and other objects in view, this invention comprises certain novel constructions, combinations, and arrangements of parts as will be hereinafter fully described, illustrated in the accompanying drawings, and more particularly pointed out in the appended claim.

In the drawings:

Figure 1 is a view showing the nozzle device and the wrapped hose of this invention in side elevation and positioned in a sewer or underground pipe.

Figure 2 is an enlarged view of the nozzle device, partly in section, and the wrapped hose in section and mounted on said nozzle device.

Figure 3 is a transverse sectional view taken on line 3—3, Figure 2, and looking in the direction of the arrows.

Figure 4 is a transverse sectional view taken on line 4—4, Figure 2 and looking in the direction of the arrows.

Figure 5 is a transverse sectional view taken on line 5—5, Figure 2, and looking in the direction of the arrows.

Figure 6 is a fragmentary view in elevation of the coiled wire structure used in connection with the hose.

Referring to the drawings by numerals, 1 designates an underground pipe, opening at 2 upon the outer atmosphere.

The nozzle device 3 comprises an internally and externally threaded sleeve 4 and externally threaded orifice 5 extends into the outer end of sleeve 4. This orifice has an enlarged grip surface formed on its outer end, whereby the operator can easily screw the orifice into the sleeve 4 or screw it outwardly for removing the same from said sleeve. This orifice 5 has a small discharge opening 6. The nozzle device 3 includes an open frame 7. This frame 7 has a transverse brace 8 preferably near its center. Extending through said brace 8 is an internally threaded stem 9 that is comparatively short in length. On this stem 9 at its inner end is a splatter disc 10. Liquid can be discharged through discharge opening 6 against the splatter disc 10. On stem 9 are threaded two nuts 11 and 12. These nuts 11 and 12 bear against opposite sides of the transverse brace 8 as clearly shown in Figure 2.

When the nozzle device is in its assembled condition, as shown, the liquid chemical is forced under pressure through the discharge opening 6 against disc 10 resulting in the liquid spreading perpendicularly to its former direction of travel, and in a radius of 360 degrees out of the nozzle frame 7 to the sewer walls.

The open frame 7 is integral with an internally threaded sleeve 13. This threaded sleeve 13 is mounted on the externally threaded outer end of the internally and externally threaded sleeve 4, as shown.

The flexible or rubber hose is mounted upon the outer reduced end of the sleeve 4, Fig. 2. Between the portion of sleeve 4 carrying the inner end of hose 14 and the enlarged grip portion 4a is an enlarged portion 15 of said sleeve 4, on which is mounted portion 16 of the coiled reinforcing wire. This portion 16 of the reinforcing wire 17 has the coils abutting which produces a tight fit doing away with any clamp at this point. Therefore, it will be seen that the coiled wire 17 reinforces the rubber hose and also performs the dual function of a clamp, holding the parts securely together.

By reason of the peculiar coiled or wrapping wire, the device is greatly strengthened, resulting in longer life for the hose, as well as the efficient mounting of the same in the assembled structure.

While I have described the preferred embodiment of the invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claim.

What I claim is:

In a device of the class described, the combination with a hose, of a sleeve extending into said hose, said sleeve provided with external and internal threads at its outer end, an orifice element threaded into said sleeve on its internal threads, an open frame provided with an internally threaded sleeve, said internally threaded sleeve mounted on the external threads of said first-mentioned sleeve, said open frame provided with a brace, said brace provided at its center with a threaded stem, said stem extending on both sides of said brace, nuts on opposite sides of said brace and threaded on said stem against said brace, said nuts normally in approximately the center of said stem, and a splatter disc integral with the inner end of said stem and positioned in front of said orifice element, the hose connected with said first mentioned sleeve having a helical wire surrounding said hose to reinforce the same and serve as a clamp to secure said hose to said sleeve.

References Cited in the file of this patent

UNITED STATES PATENTS

| 972,372 | Harding | Oct. 11, 1910 |
| 1,483,028 | Walsh | Feb. 5, 1924 |
| 2,132,720 | Christensen | Oct. 11, 1932 |
| 2,530,002 | Coy | Nov. 14, 1950 |

FOREIGN PATENTS

| 20,001 of 1913 | Great Britain | Sept. 4, 1913 |